(12) United States Patent
Nirmalan et al.

(10) Patent No.: US 6,904,747 B2
(45) Date of Patent: Jun. 14, 2005

(54) HEAT EXCHANGER FOR POWER GENERATION EQUIPMENT

(75) Inventors: Nirm Velumylm Nirmalan, Niskayuna, NY (US); Michael John Bowman, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 99 days.

(21) Appl. No.: 10/231,701

(22) Filed: Aug. 30, 2002

(65) Prior Publication Data

US 2004/0040280 A1 Mar. 4, 2004

(51) Int. Cl.[7] .............................................. F02C 7/08
(52) U.S. Cl. ............ 60/39.511; 165/133; 165/DIG. 516
(58) Field of Search ........................ 60/39.511; 165/133, 165/DIG. 515, DIG. 516; 415/178; 416/96.4

(56) References Cited

U.S. PATENT DOCUMENTS

| | | | | |
|---|---|---|---|---|
| 2,801,073 A | * | 7/1957 | Savage | ...................... 416/96 A |
| 3,322,189 A | | 5/1967 | Topouzian | |
| 3,507,115 A | | 4/1970 | Wosika | |
| 4,506,502 A | | 3/1985 | Shapiro | |
| 6,098,397 A | * | 8/2000 | Glezer et al. | .................. 60/772 |
| 6,224,329 B1 | * | 5/2001 | North | .......................... 415/116 |
| 6,244,333 B1 | | 6/2001 | Bergh et al. | |
| 6,318,066 B1 | | 11/2001 | Skowronski | |
| 6,439,846 B1 | * | 8/2002 | Anderson et al. | ......... 416/96 A |
| 2002/0079085 A1 | | 6/2002 | Rentz | |

FOREIGN PATENT DOCUMENTS

| | | |
|---|---|---|
| GB | 1128018 | 9/1968 |
| WO | 0162372 A | 8/2001 |

OTHER PUBLICATIONS

Casamassa et al. Jet Aircraft Power Systems; McGraw–Hill, New York, 1957. p. 292.*
Copy of EPO Search Report Dated Dec. 22, 2003.

* cited by examiner

Primary Examiner—Louis J. Casaregola
(74) Attorney, Agent, or Firm—Ann M. Agosti; Patrick K. Patnode

(57) ABSTRACT

A heat exchanger for a turbine is provided wherein the heat exchanger comprises a heat transfer cell comprising a sheet of material having two opposed ends and two opposed sides. In addition, a plurality of concavities are disposed on a surface portion of the sheet of material so as to cause hydrodynamic interactions and affect a heat transfer rate of the turbine between a fluid and the concavities when the fluid is disposed over the concavities.

29 Claims, 3 Drawing Sheets

HEAT EXCHANGER FOR POWER GENERATION EQUIPMENT

FEDERAL RESEARCH STATEMENT

The U.S. Government may have certain rights in this invention pursuant to contract number DEFC0200CH11063 awarded by the Department of Energy (DOE).

BACKGROUND OF INVENTION

The present invention relates generally to power generation equipment, and more particularly to improved heat exchangers for turbines.

Gas turbines and microturbines typically use heat exchangers, also known as recuperators, to increase their efficiency. In order to increase their efficiency, air-to-air primary surface or plate fin heat exchangers are typically used to recover thermal energy from high temperature exhaust gases emitted from such turbines. The heat exchanger typically comprises a hot-side flow path and a cold-side flow path. The high temperature exhaust gases of the turbine are typically routed through the hot-side flow path of the heat exchanger, while a relatively cooler combustion air exits a compressor and is routed through the cold-side flow path on its way to a combustor. Heat energy is typically transferred from the high temperature exhaust gases in the hot-side flow path to the lower temperature combustion air disposed in the cold-side flow path by convection from the high temperature exhaust fluid to a wall adjacent the cold-side flow path thereby heating the combustion air. As a result, the combustion air exits the heat exchanger and enters the combustor having been pre-heated and thereby providing increased cycle efficiency and utilizing the heat energy from the high temperature exhaust gases that would otherwise be lost.

While heat exchangers have demonstrated the potential for high efficiency in gas turbines and microturbines, some problems remain associated with the heat transfer between the high temperature exhaust gases and the combustion air. In some designs, the heat transfer between the high temperature exhaust gases and the combustion air primarily occurs between smooth channels formed between corrugated sheets thereby failing to optimize the surface area used in the conduction of heat between the gases and the air. The smooth channels typically have an undesired characteristic of providing low thermal transfer coefficients between the channel surface and the combustion air.

Accordingly, there is a need in the art for a turbine having an improved heat exchanger that provides improved heat transfer characteristics.

SUMMARY OF INVENTION

One embodiment of the present invention comprises a heat exchanger for a turbine comprising a heat transfer cell comprising a sheet of material having two opposed ends and two opposed sides. In addition, a plurality of concavities are disposed on a surface portion of the sheet of material so as to cause hydrodynamic interactions and affect a heat transfer rate of the turbine between a fluid and the concavities when the fluid is disposed over the concavities.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
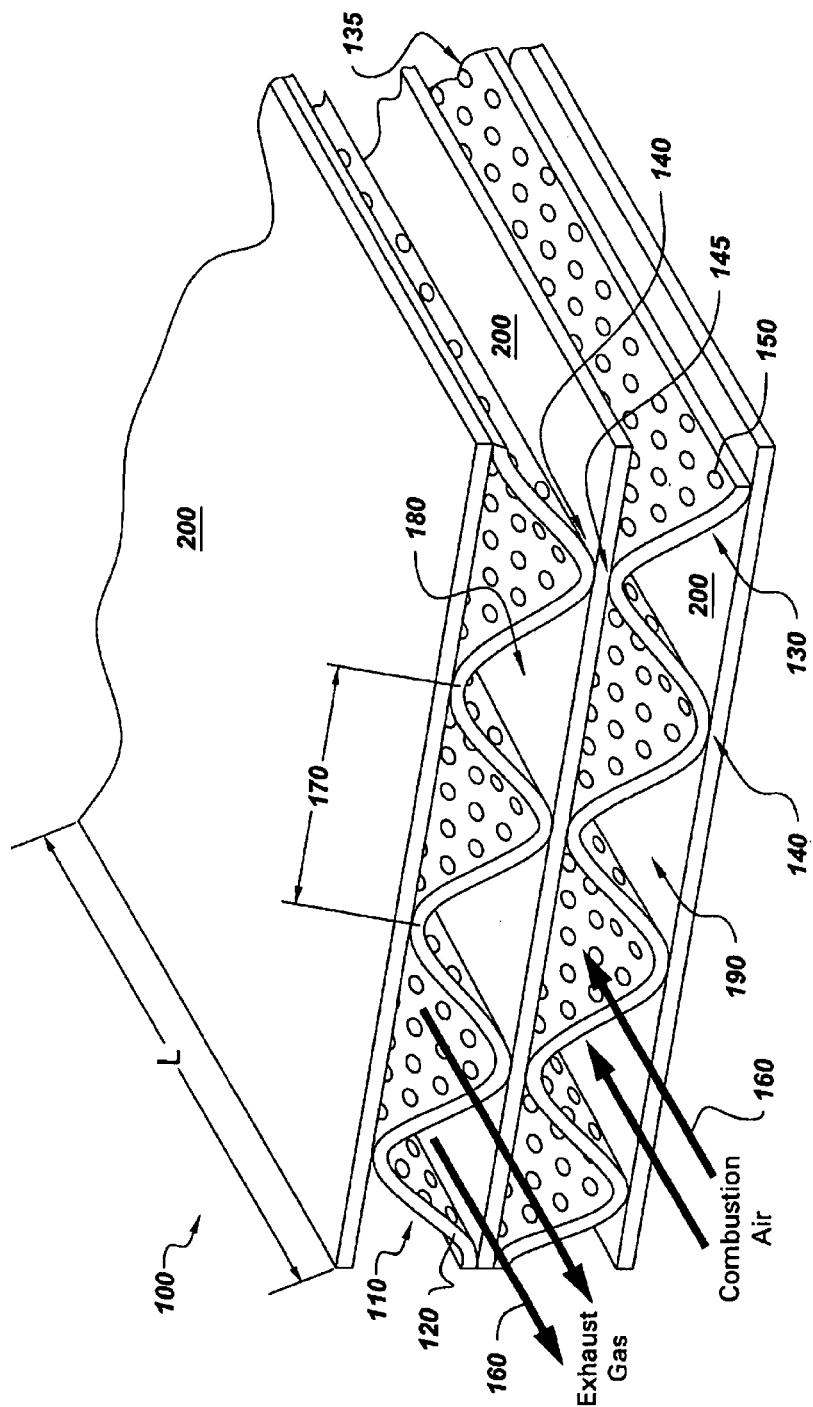
FIG. 1 is a perspective view of a heat exchanger for a turbine in accordance with one embodiment of the present invention.

A heat exchanger 100 is provided for a turbine in FIG. 1. The heat exchanger 100 comprises a (meaning at least one) heat transfer cell 110. The heat transfer cell 110 comprises a (meaning at least one) sheet of material 120 having two opposed ends 130, 135 and two opposed sides 140, 145. In addition, a plurality of concavities 150 are disposed on a surface portion of the material 120 so as to cause hydrodyamic interactions and affect a heat transfer rate of the turbine between a fluid 160 and the concavities 150 when the fluid 160 is disposed over the concavities 150. As used herein, the terms "on", "in", "over", "thereon", "therein", "above", "under", "into" and the like are used to refer to relative location of elements of the heat exchanger 100 as illustrated in the Figures and are not meant to be a limitation in any manner with respect to the orientation or operation of the heat exchanger 100. In one embodiment, the fluid 160 comprises air. The turbine is typically selected from the group consisting of gas turbines and microturbines.

Figure 2:
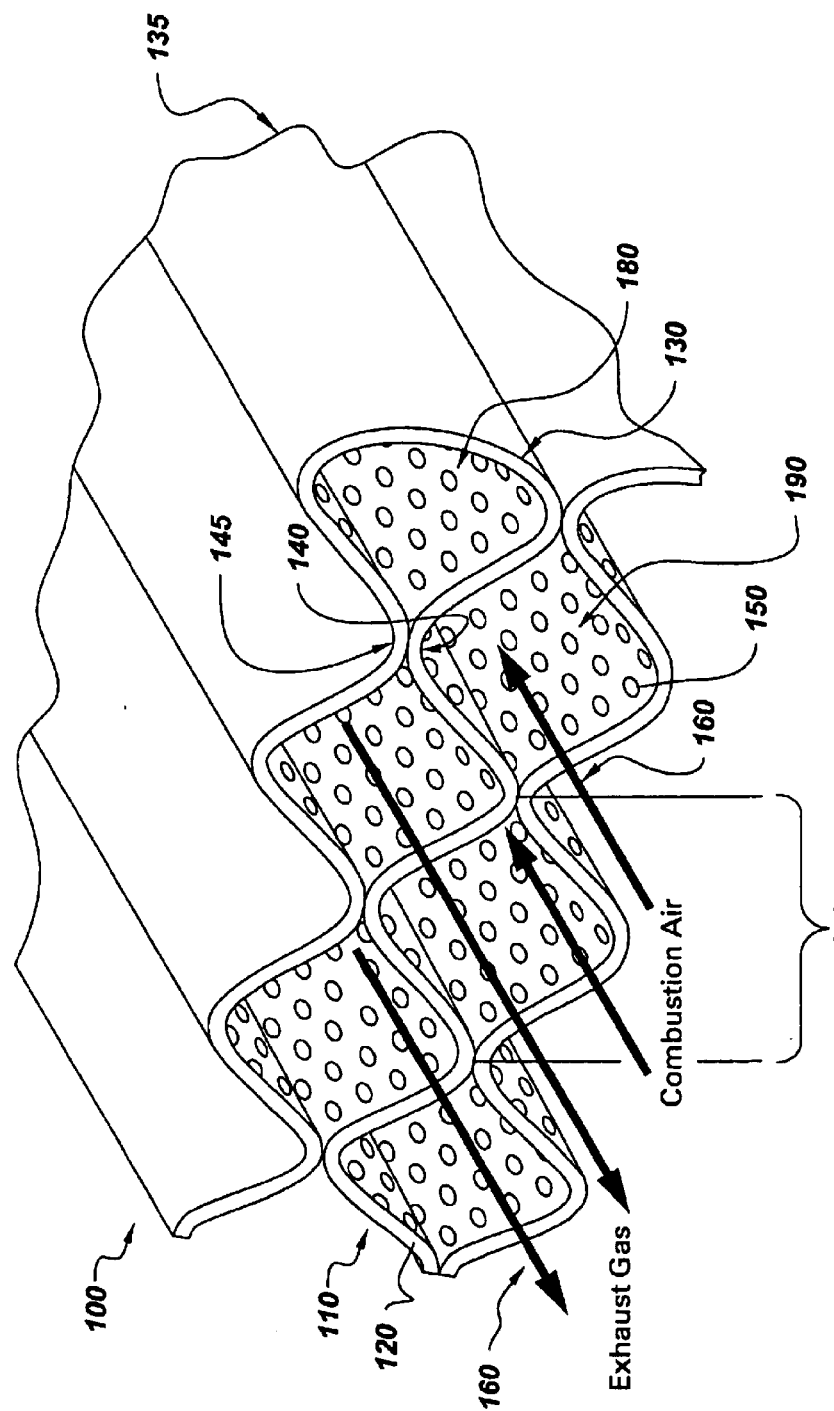
FIG. 2 is a perspective of a heat exchanger for a turbine in accordance with another embodiment of the present invention.

The sheet of material 120 is typically folded over upon itself such that the sides 140, 145 are proximate one another (e.g. sides 140 and 145 as shown in FIG. 2) so as to define a (meaning at least one) chamber 170 between each of the sides 140, 145 (see FIG. 2). The proximate sides are typically coupled to one another. As used herein, the term "coupled" refers to a mechanical attachment of the sides 140, 145 of the heat exchanger 100 and includes, without limitation, welding, brazing, soldering and the like, as well as machining, metal-forming and casting the members as a single part. In other configurations, a (meaning at least one) plate 200 is coupled to at least one of the heat transfer cells 110 so as to define a plurality of chambers 170 between the plate 200 and the heat transfer cells 110 (see FIG. 1). By way of example and not limitation, the material 120 typically comprises stainless steel, iron, nickel based alloys and combinations thereof. The cross-sectional shape of the material 120 typically comprises corrugated, square, triangular, honeycomb and irregular shapes.

Figure 3:
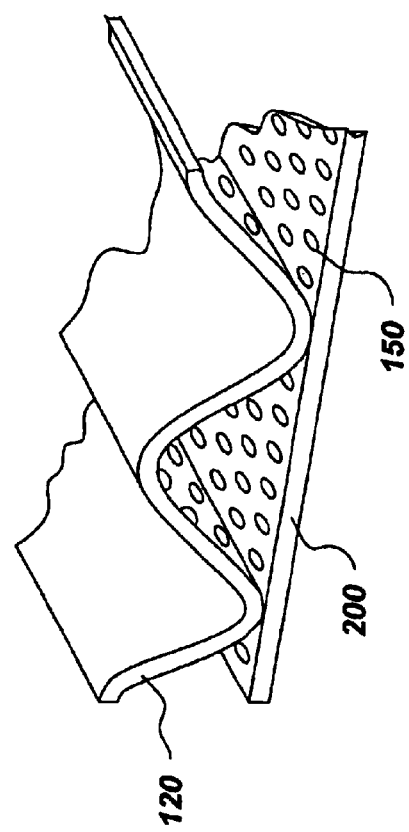
FIG. 3 is a perspective view of a portion of a plate in accordance with another embodiment of the present invention.

In one embodiment of the present invention, FIGS. 1–3 show a plurality of concavities 150 disposed on a surface portion of the material 120 (see FIGS. 1 and 2) and disposed on a surface portion of the plate 200 (see FIG. 3). As used herein, the term "concavity" refers to depressions, indentations, dimples, pits or the like. The shape of the concavities 150 is typically hemispherical or inverted and truncated conically shaped. In some embodiments, the shape of the concavities 150 is typically any sector of a full hemisphere. It will be appreciated that in other embodiments, the concavities 150 may be disposed on an entirety or a surface portion of the material 120, the plate 200, or both depending on a desired application. In addition, the number of sheets of material 120, plates 200, concavities 150 and chambers 170 are left to the artisan to determine based upon predetermined design requirements, for example, heat transfer rate and thermal gradient uniformity. Furthermore, the width and length of the material 120 and plates 200 as well as the shape and thickness are shown in the Figures by way of example and not limitation and may be varied by the artisan depending upon a desired application.

One aspect of the present invention is that the concavities 150 are typically formed on the abovementioned surfaces in a predetermined pattern so as to enhance the heat transfer from a (meaning at least one) hot-side flow path 180 to a (meaning at least one) cold-side flow path 190. In operation, a high-temperature exhaust gas (as indicated by the solid arrows projecting out of the paper and labeled "EXHAUST GAS" in drawing FIGS. 1 and 2) of the turbine (not shown) is typically directed through the hot-side flow path 180 while a relatively cooler combustion air (as indicated by the solid arrows projecting into the paper and labeled "COMBUSTION AIR" in drawing FIGS. 1 and 2) exits a compressor (not shown) and is directed through the cold-side flow path 190. In some embodiments, the temperature of the exhaust gas is greater than the temperature of the combustion air and such temperatures may vary depending upon turbine requirements and the materials used in the construction of the heat exchanger 100. It will be appreciated that the term "high-temperature exhaust gas" is not meant to require the exhaust gases to have a specific temperature; rather, they are used to mean that the temperature of the exhaust gas is sufficient to transfer heat to the combustion air via convection.

Another aspect of the present invention is that the heat energy transferred from the high-temperature exhaust gases in the hot-side flow path 180 to the lower temperature combustion air disposed in the cold-side flow path 190 is increased compared to conventional heat exchangers due to the hydrodynamic interactions between the fluid 160, for example the combustion air, and the concavities 150. As used herein, the term "hydrodynamic interactions" refers to the interactions between the concavities 150 and the fluid 160 in which each concavity 150 creates a pressure field within the concavity 150 so as to create a vortex pattern (not shown) in a portion of the flow of the fluid 160. The vortex pattern created in the combustion air, for example, allows for an increase in the heat transfer from walls located in the cold-side flow path 190 to the combustion air thereby preheating such combustion air to a higher temperature (compared to conventional heat exchangers) prior to entering a combustor (not shown).

The heat transfer rate between the fluid 160 and each respective concavity 150 is also increased (compared to designs having surfaces without concavities 150) due to an increase in the surface area caused by the shape of each respective concavity 230. As such, the fluid 160 interacts with such increased surface area thereby further enhancing the removal of heat energy from the heat exchanger. It will be appreciated that in some embodiments the increase in heat transfer rate is not directly proportional to the increase in the surface area and may often be greater depending upon a predetermined design.

Figure 4:
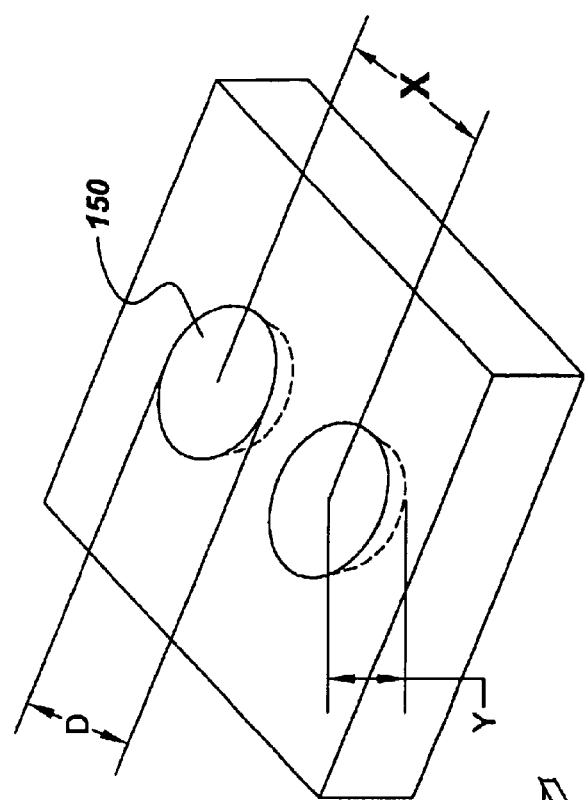
FIG. 4 is a perspective view of a portion of a heat transfer cell having a plurality of concavities disposed thereon in accordance with another embodiment of the present invention.

The depth "Y" (see FIG. 4) for a given one of the concavities 150 typically remains constant through the length "L" of the heat exchanger 100 (see FIG. 1). The depth "Y" (see FIG. 4) is generally in the range between about 0.10 to about 0.50 times the concavity surface diameter "D". In addition, the depth "Y" of the concavities 150 is in the range between about 0.002 inches to about 0.125 inches. The center-to-center spacing "X" of the concavities 150 is generally in the range between about 1.1 to about 2 times the surface diameter "D" of the concavities 150. In one embodiment, the concavities 150 are typically formed by using a pulse electrochemical machining (PECM) process. In an alternative embodiment, the concavities 150 are typically formed by using an electro-discharge machining (EDM) process.

It will be apparent to those skilled in the art that, while the invention has been illustrated and described herein in accordance with the patent statutes, modification and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A heat exchanger for receiving exhaust fluid from a turbine and combustion fluid from a compressor, the heat exchanger comprising:

a heat transfer cell comprising a sheet of material having two opposed ends and two opposed sides; and a plurality of concavities disposed on a surface portion of said material so as to cause hydrodynamic interactions and affect a heat transfer rate of said turbine between said exhaust fluid from said turbine and said combustion fluid from said compressor and said concavities when said exhaust fluid and said combustion fluid are disposed over said concavities.

2. heat exchanger of claim 1 wherein said sheet of material is folded over upon itself such that said sides are proximate one another so as to define a chamber between each of said sides.

3. The heat exchanger of claim 2 wherein said sides proximate one another are welded to each other.

4. A heat exchanger for a turbine comprising:

a heat transfer cell comprising a sheet of material having two opposed ends and two opposed sides; and a plurality of concavities disposed on a surface portion of said material so as to cause hydrodynamic interactions and affect a heat transfer rate of said turbine between a fluid and said concavities when said fluid is disposed over said concavities, wherein at least one plate is coupled to at least one of said heat transfer cells so as to define a plurality of chambers between said plate and said heat transfer cells.

5. The heat exchanger according to claim 1 wherein said turbine is selected from the group consisting of gas turbines and microturbines.

6. The heat exchanger according to claim 1 wherein a cross-sectional shape of said material is selected from the group consisting of corrugated, square, triangular, honeycomb and irregular shapes.

7. The heat exchanger according to claim 1 wherein a composition of said material is selected from the group consisting of stainless steel, iron, nickel-based alloy and combinations thereof.

8. The heat exchanger according to claim 1 wherein said concavities are selected from the group consisting of depressions, indentations, dimples and pits.

9. The heat exchanger according to claim 1 wherein the depth (Y) of said concavities remains constant over the length (L) of said heat transfer cell.

10. The heat exchanger according to claim 1 wherein the depth (Y) of said concavities is in the range between about 0.002 inches to about 0.125 inches.

11. The heat exchanger according to claim 1 wherein the depth (Y) of said concavities is in the range between about 0.10 to about 0.50 times the surface diameter (D) of said concavities.

12. The heat exchanger according to claim 1 wherein said concavities have a center-to-center spacing (X) in the range between about 1.1 to about 2.0 times the surface diameter (D) of said concavities.

13. The heat exchanger according to claim 1 wherein said exhaust fluid comprises air.

14. A gas turbine assembly comprising:

a compressor;

a combustor coupled to said compressor;

a turbine generator coupled to said compressor; and a heat exchanger comprising a heat transfer cell comprising a sheet of material having two opposed ends and two opposed sides and a plurality of concavities disposed on a surface portion of said material so as to cause hydrodynamic interactions and affect a heat transfer rate between exhaust fluid from said turbine generator and combustion fluid from said compressor and said concavities when said exhaust fluid and said combustion fluid are disposed over said concavities.

15. The gas turbine assembly of claim 14 wherein said sheet of material is folded over upon itself such that said sides are proximate one another so as to define a chamber between each of said sides.

16. The gas turbine assembly of claim 15 wherein said sides proximate one another are welded to each other.

17. A gas turbine assembly comprising:

a compressor;

a combustor coupled to said compressor;

a turbine generator coupled to said compressor; and a heat exchanger comprising a heat transfer cell comprising a sheet of material having two opposed ends and two opposed sides and a plurality of concavities disposed on a surface portion of said material so as to cause hydrodynamic interactions and affect a heat transfer rate between a fluid and said concavities when said fluid is disposed over said concavities, wherein at least one plate is coupled to at least one of said heat transfer cells so as to define a plurality of chambers between said plate and said heat transfer cells.

18. The gas turbine assembly of claim 14 wherein a cross-sectional shape of said material is selected from the group consisting of corrugated, square, triangular, honeycomb and irregular shapes.

19. The gas turbine assembly of claim 14 wherein a composition of said material is selected from the group consisting of stainless steel, iron, nickel-based alloy and combinations thereof.

20. The gas turbine assembly of claim 14 wherein said concavities are selected from the group consisting of depressions, indentations, dimples and pits.

21. The gas turbine assembly of claim 14 wherein the depth (Y) of said concavities remains constant over the length (L) of said heat transfer cell.

22. The gas turbine assembly of claim 14 wherein the depth (Y) of said concavities is in the range between about 0.002 inches to about 0.125 inches.

23. The gas turbine assembly of claim 14 wherein the depth (Y) of said concavities is in the range between about 0.10 to about 0.50 times the surface diameter (D) of said concavities.

24. The gas turbine assembly of claim 14 wherein said concavities have a center-to-center spacing (X) in the range between about 1.1 to about 2.0 times the surface diameter (D) of said concavities.

25. The gas turbine assembly of claim 14 wherein said exhaust fluid comprises air.

26. A heat exchanger for a turbine comprising:

a heat transfer cell comprising a sheet of material having two opposed ends and two opposed sides; and a plurality of concavities disposed on a surface portion of said material so as to cause hydrodynamic interactions and affect a heat transfer rate of said turbine between a fluid and said concavities when said fluid is disposed over said concavities, wherein a cross-sectional shape of said material comprises a honeycomb shape.

27. The heat exchanger according to claim 1 wherein a composition of said material comprises a nickel-based alloy.

28. A gas turbine assembly comprising:

a compressor;

a combustor coupled to said compressor;

a turbine generator coupled to said compressor; and a heat exchanger comprising a heat transfer cell comprising a sheet of material having two opposed ends and two opposed sides and a plurality of concavities disposed on a surface portion of said material so as to cause hydrodynamic interactions and affect a heat transfer rate between a fluid and said concavities when said fluid is disposed over said concavities, wherein a cross-sectional shape of said material comprises a honeycomb shape.

29. The gas turbine assembly of claim 14 wherein a composition of said material comprises a nickel-based alloy.

* * * * *